(12) United States Patent
Lim et al.

(10) Patent No.: US 7,918,479 B2
(45) Date of Patent: Apr. 5, 2011

(54) CURTAIN AIRBAG

(75) Inventors: Changhyun Lim, Bucheon-si (KR); Jaesoon Cho, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 204 days.

(21) Appl. No.: 12/324,477

(22) Filed: Nov. 26, 2008

(65) Prior Publication Data

US 2009/0152852 A1    Jun. 18, 2009

(30) Foreign Application Priority Data

Dec. 13, 2007   (KR) .................. 10-2007-0130024

(51) Int. Cl.
  *B60R 21/20*  (2006.01)
  *B60R 21/213* (2006.01)
(52) U.S. Cl. .................. 280/728.2; 280/730.2
(58) Field of Classification Search .............. 280/728.1, 280/728.2, 730.2, 749
  See application file for complete search history.

(56) References Cited

U.S. PATENT DOCUMENTS

| | | | |
|---|---|---|---|
| 5,899,486 A * | 5/1999 | Ibe | 280/728.2 |
| 7,125,038 B2 | 10/2006 | Gammill | |
| 7,152,875 B2 * | 12/2006 | Kai | 280/739 |
| 2002/0135160 A1 * | 9/2002 | Lorenz | 280/728.1 |
| 2007/0035112 A1 * | 2/2007 | Takahara | 280/730.2 |
| 2008/0111351 A1 * | 5/2008 | Eckert et al. | 280/728.2 |

FOREIGN PATENT DOCUMENTS

| | | |
|---|---|---|
| JP | 2005-178612 A | 7/2005 |
| JP | 2006 151277 A | 6/2006 |
| JP | 2007-210370 A | 8/2007 |
| JP | 2007-296876 A | 11/2007 |
| KR | 10 0736007 B1 | 6/2007 |

\* cited by examiner

*Primary Examiner* — Paul N Dickson
*Assistant Examiner* — Joseph Rocca
(74) *Attorney, Agent, or Firm* — Morgan, Lewis & Bockius LLP

(57) ABSTRACT

A curtain airbag may include a tube assembly coupled to an inflator and supplying inflation gas generated by the inflator into a cushion, wherein the tube assembly is inserted into a fabric wrap receiving the cushion and the fabric wrap is fixed to the tube assembly.

13 Claims, 3 Drawing Sheets

CURTAIN AIRBAG

CROSS-REFERENCE TO RELATED APPLICATIONS

The present application claims priority to Korean Patent Application Number 10-2007-0130024 filed Dec. 13, 2007, the entire contents of application is incorporated herein for all purposes by this reference.

BACKGROUND OF THE INVENTION

1. Field of the Invention

The present invention relates to a curtain airbag, and more particularly, to a device for preventing rotation of a gas guider for a curtain airbag where a locking bracket to be inserted into a fabric wrap is integrally formed on one side of a tube assembly so that a cushion is assembled in position.

2. Description of Related Art

In general, a curtain airbag is provided in a head lining of a vehicle cabin, and inflated from top toward bottom during a side collision in order to ensure passenger's safety.

For this purpose, the curtain airbag includes an inflator, a tube assembly, a cushion, and a fabric wrap. The inflator generates high-pressure inflation gas according to an inflation signal that is input during the collision. The tube assembly is connected to the inflator so that inflation gas flows through the tube assembly. The cushion is supplied with inflation gas that is supplied from the tube assembly, and is inflated. The fabric wrap surrounds the outer portion of the cushion, and makes the cushion be received in the head lining.

Further, the tube assembly includes a gas guider that is connected to the inflator, and a gas supply pipe that is connected to the gas guider and inserted into the cushion.

In this case, the gas supply pipe needs to be in proper position in the cushion. The reason for this is to jet the inflation gas generated by the inflator into the cushion in an appropriate direction when the curtain airbag is inflated.

However, since the fabric wrap of the curtain airbag in the related art has a very large length, the curtain airbag is not in proper position and partially twisted when being assembled in the head lining. For this reason, the gas supply pipe to be inserted into the cushion is not in proper position. As a result, there is a problem in that it is not possible to inflate the cushion in an appropriate direction.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a curtain airbag that solves an assembly defect of a curtain airbag and achieves normal functions of the curtain airbag by assembling a cushion of the curtain airbag, which is provided in a head lining of a vehicle cabin, in position in order to inflate the cushion in a designed direction during the operation of the curtain airbag.

A curtain airbag may include a tube assembly coupled to an inflator and supplying inflation gas generated by the inflator into a cushion, wherein the tube assembly is inserted into a fabric wrap receiving the cushion and the fabric wrap is fixed to the tube assembly.

At least a portion of cross section of the tube assembly may be asymmetric in a circumference direction thereof to have a directionality.

The tube assembly may include a locking bracket inserted into the fabric wrap and fixing the fabric wrap thereto, a gas supply pipe configured to pass through the locking bracket, wherein the inflation gas is supplied to the cushion through the gas supply pipe from the inflator, and/or a gas guider, one end of which is coupled to the gas supply pipe and the other end of which is engaged with the inflator therethrough.

At least a portion of cross section of the locking bracket may be asymmetric in a circumference direction thereof to have directionality.

The locking bracket includes at least one flat shaped surface.

The locking bracket may protrude outwards along entire length of the gas guider in a radial direction thereof.

The locking bracket may be integrally formed to one side of the gas guider.

The locking bracket may include a mounting portion between body of the locking bracket and the gas guider and has cross-section smaller that cross section of the body of the locking bracket. The fabric wrap may be fixed to the mounting portion of the locking bracket by a band clamp.

The locking bracket may include an opening that is configured to reduce weight. The opening may be formed along a longitudinal direction of the locking bracket.

Other aspects of the present invention are directed to a curtain airbag which may include a tube assembly coupled to an inflator and supplying inflation gas generated by the inflator into a cushion, the tube assembly being inserted into a fabric wrap that receives the cushion and is fixed to the tube assembly, wherein the tube assembly includes a locking bracket inserted into the fabric wrap and fixing the fabric wrap thereto, a gas supply pipe configured to pass through the locking bracket, wherein the inflation gas is supplied to the cushion through the gas supply pipe from the inflator, and/or a gas guider, one end of which is coupled to the gas supply pipe and the other end of which is engaged with the inflator therethrough, and wherein at least a portion of cross section of the locking bracket is asymmetric in a circumference direction thereof to have a directionality.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 1:
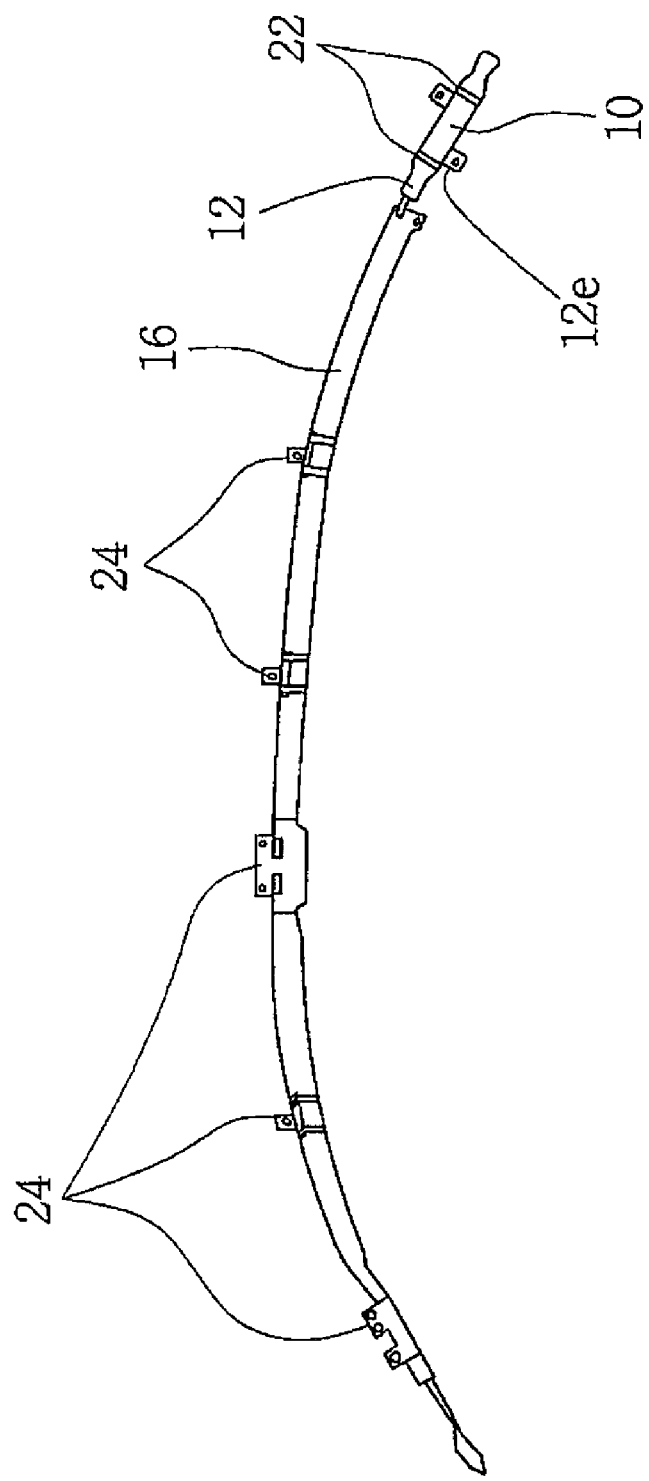
FIG. 1 is a view showing the entire structure of an exemplary curtain airbag according to the present invention.
Figure 2:
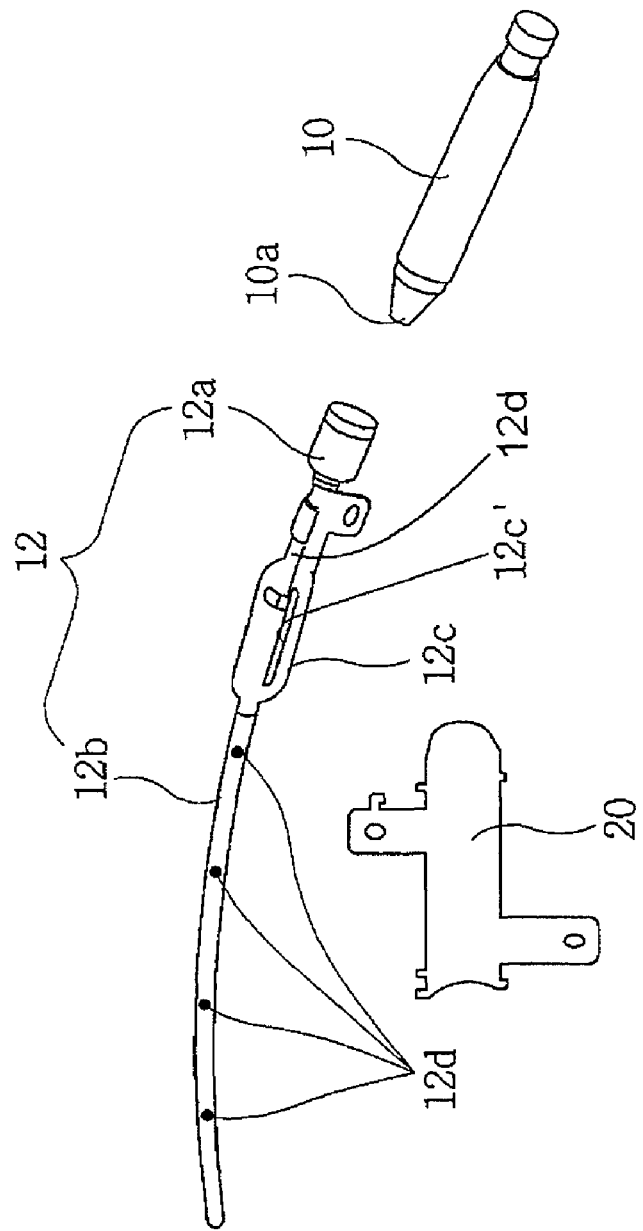
FIG. 2 is an exploded perspective view of an inflator and a tube assembly shown in FIG. 1.
Figure 3:
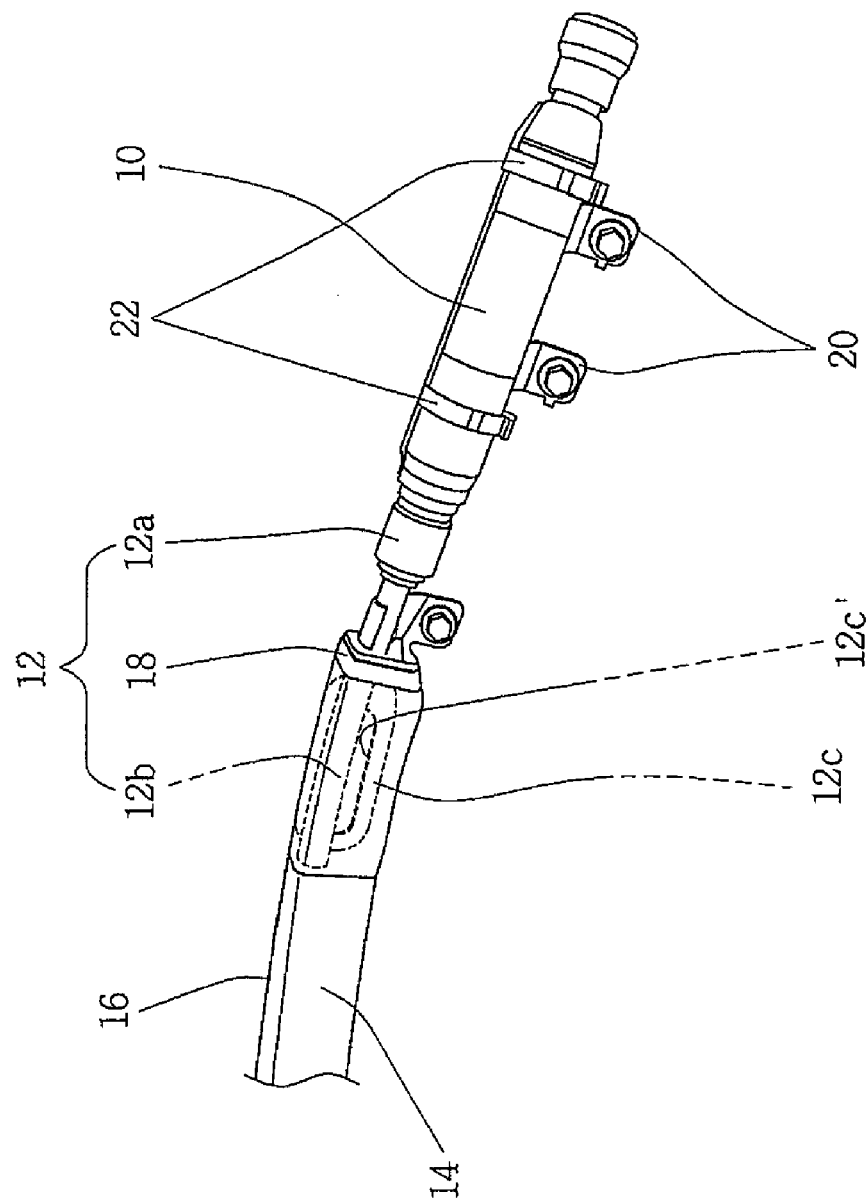
FIG. 3 is an enlarged view of an assembled portion between a fabric wrap and the tube assembly shown in FIG. 1.

As shown in FIGS. 1 to 3, a curtain airbag to which an exemplary embodiment of the present invention is applied is provided in a head lining of a vehicle cabin, and ensures passenger's safety during the collision.

For this purpose, the curtain airbag includes an inflator 10, a tube assembly 12, a cushion 14, and a fabric wrap 16. The inflator 10 generates high-pressure inflation gas by burning a gas generating agent according to an inflation signal that is input during the collision. The tube assembly 12 is connected to an outlet of inflator 10 so that inflation gas flows through the tube assembly 12. The cushion 14 is supplied with inflation gas that is supplied from tube assembly 12, and is inflated. The fabric wrap 16 surrounds the outer portion of cushion 14, and makes the cushion be received in the head lining. The cushion and the fabric wrap form a cushioning portion.

Tube assembly 12 includes a gas guider 12a that is connected to outlet 10a of inflator 10, and a gas supply pipe 12b that is coupled to gas guider 12a and inserted into cushion 14.

Gas guider 12a is integrally formed with a locking bracket 12c that is inserted into fabric wrap 16 and to prevent cushion 14 from bring rotated.

Locking bracket 12c is formed of a flat plate that protrudes outward along the entire length of gas guider 12a in radial direction, and has an opening 12c' formed by removing an inner portion of the locking bracket in order to reduce the weight thereof. The locking bracket 12c functions an indicator to assembly the fabric wrap 16 to the gas supply pipe 12b as explained later in detail.

Locking bracket 12c includes a mounting portion 12d whose thickness is smaller than body of the locking bracket 12c. Accordingly, locking bracket 12c is inserted into fabric wrap 16, and can be firmly connected to fabric wrap 16 by a band clamp 18 that is fastened to the outer portion of fabric wrap 16 through the mounting portion 12d. In this configuration, it is possible to suppress the rotation of fabric wrap 16 and cushion 14. As a result, the curtain airbag can inflate cushion 14 in proper position in a designed direction during the collision.

Further, a plurality of outlets 12d is formed on gas supply pipe 12b at regular intervals in order to supply inflation gas to cushion 14. In this case, since the direction of each outlet 12d has a large effect on the direction in which cushion 14 is inflated, when the curtain airbag is assembled, the direction of gas supply pipe 12b is very important.

In this case, in an exemplary embodiment of the present invention, since the locking bracket 12c has a directionality, such as flat plate shape as set forth above, one may easily align the fabric wrap 16 to the gas supply pipe 12b and assemble them according to the directionality of the locking bracket 12c. Furthermore due to the directionality of the locking bracket 12c, the fabric wrap 16 and the cushion 14 are prevented from being rotated.

Reference numerals 24, which are not described in the drawings, indicate a plurality of mounting brackets that is used to fix fabric wrap 16 in the head lining.

Since locking bracket 12c that is formed on one side of tube assembly 12 is inserted into fabric wrap 16, fabric wrap 16 and cushion 14 can be assembled in position in the head lining. As a result, it is possible to significantly reduce fraction defective while the curtain airbag is assembled.

That is, if cushion 14 assembled in the head lining is assembled at a predetermined position in fabric wrap 16 by locking bracket 12c that is integrally formed with gas guider 12a, gas supply pipe 12b connected to gas guider 12a can also be in position. Therefore, the plurality of outlets 12d formed on gas supply pipe 12b are also in position. As a result, when the curtain airbag is operated, it is possible to inflate cushion 14 in a designed direction.

Furthermore, inflator 10 is firmly fixed into the head lining. For this purpose, inflator 10 is firmly fixed by mounting bracket 20 and band clamps 22, wherein the band clamps 22 enclose and fasten the distal end portions of the mounting bracket 20 in an exemplary embodiment of the present invention.

For convenience in explanation and accurate definition in the appended claims, the terms "outer" and "inner" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A curtain airbag comprising:
    a tube assembly coupled to an inflator and supplying inflation gas generated by the inflator into a cushion, wherein the tube assembly is inserted into a fabric wrap receiving the cushion and the fabric wrap is fixed to the tube assembly;
    wherein the tube assembly includes:
        a locking bracket inserted into the fabric wrap and fixing the fabric wrap thereto;
        a gas supply pipe configured to pass through the locking bracket, wherein the inflation gas is supplied to the cushion through the gas supply pipe from the inflator; and
        a gas guider, one end of which is coupled to the gas supply pipe and the other end of which is engaged with the inflator therethrough.

2. The curtain airbag as defined in claim 1, wherein at least a portion of cross section of the tube assembly is asymmetric in a circumference direction thereof to have a directionality.

3. The curtain airbag as defined in claim 1, wherein at least a portion of cross section of the locking bracket is asymmetric in a circumference direction thereof to have directionality.

4. The curtain airbag as defined in claim 1, wherein the locking bracket includes at least one flat shaped surface.

5. The curtain airbag as defined in claim 1, wherein the locking bracket protrudes outwards along entire length of the gas guider in a radial direction thereof.

6. The curtain airbag as defined in claim 1, wherein the locking bracket is integrally formed to one side of the gas guider.

7. The curtain airbag as defined in claim 1, wherein the locking bracket includes a mounting portion between body of the locking bracket and the gas guider and has cross-section smaller that cross section of the body of the locking bracket.

8. The curtain airbag as defined in claim 7, wherein the fabric wrap is fixed to the mounting portion of the locking bracket by a band clamp.

9. The curtain airbag as defined in claim 1, wherein the locking bracket includes an opening that is configured to reduce weight.

10. The curtain airbag as defined in claim 9, wherein the opening is formed along a longitudinal direction of the locking bracket.

11. A passenger vehicle comprising the curtain airbag as defined in claim 1.

12. A curtain airbag comprising:
   a tube assembly coupled to an inflator and supplying inflation gas generated by the inflator into a cushion, the tube assembly being inserted into a fabric wrap that receives the cushion and is fixed to the tube assembly,
   wherein the tube assembly includes:
   a locking bracket inserted into the fabric wrap and fixing the fabric wrap thereto;
   a gas supply pipe configured to pass through the locking bracket, wherein the inflation gas is supplied to the cushion through the gas supply pipe from the inflator; and
   a gas guider, one end of which is coupled to the gas supply pipe and the other end of which is engaged with the inflator therethrough, and
   wherein at least a portion of cross section of the locking bracket is asymmetric in a circumference direction thereof to have directionality.

13. A passenger vehicle comprising the curtain airbag as defined in claim 12.

* * * * *